(12) United States Patent
Truong et al.

(10) Patent No.: US 11,934,486 B2
(45) Date of Patent: *Mar. 19, 2024

(54) SYSTEMS AND METHODS FOR DATA STREAM USING SYNTHETIC DATA

(71) Applicant: Capital One Services, LLC, McLean, VA (US)

(72) Inventors: Anh Truong, Champaign, IL (US); Jeremy Goodsitt, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 511 days.

This patent is subject to a terminal disclaimer.

(21) Appl. No.: 16/950,399

(22) Filed: Nov. 17, 2020

(65) Prior Publication Data

US 2021/0133504 A1  May 6, 2021

Related U.S. Application Data

(63) Continuation of application No. 16/596,886, filed on Oct. 9, 2019, now Pat. No. 10,860,892.

(51) Int. Cl.
| | |
|---|---|
| *G06F 18/214* | (2023.01) |
| *G06F 3/06* | (2006.01) |
| *G06F 9/50* | (2006.01) |
| *G06N 3/049* | (2023.01) |

(52) U.S. Cl.
CPC ........ *G06F 18/2148* (2023.01); *G06F 3/0617* (2013.01); *G06F 3/0644* (2013.01); *G06F 3/065* (2013.01); *G06F 3/0652* (2013.01); *G06F 3/0653* (2013.01); *G06F 3/0685* (2013.01); *G06F 9/5016* (2013.01); *G06N 3/049* (2013.01)

(58) Field of Classification Search
None
See application file for complete search history.

(56) References Cited

U.S. PATENT DOCUMENTS

| | | | |
|---|---|---|---|
| 10,860,892 B1 * | 12/2020 | Truong | G06F 3/0617 |
| 2013/0138613 A1 | 5/2013 | Paulzagade | |
| 2014/0325251 A1 | 10/2014 | Marwah | |
| 2016/0019271 A1 | 1/2016 | Ma | |
| 2018/0018590 A1 | 1/2018 | Szeto | |
| 2018/0247078 A1 | 8/2018 | Newman | |

* cited by examiner

*Primary Examiner* — Alan Chen
(74) *Attorney, Agent, or Firm* — FINNEGAN, HENDERSON, FARABOW, GARRETT & DUNNER, LLP

(57) ABSTRACT

Systems and methods for synthetic data generation. A system includes at least one processor and a storage medium storing instructions that, when executed by the one or more processors, cause the at least one processor to perform operations including receiving a continuous data stream from an outside source, processing the continuous data stream in real-time, and using machine learning techniques to generating synthetic data to populate the dataset. The operations also include creating a plurality of bins, wherein the plurality of bins occupy a data range between the determined minimum and maximum values without overlapping; and determining a number of samples within each of the created bin, based on a bin edges, wherein the bin edges are bounds within the data range.

20 Claims, 6 Drawing Sheets

SYSTEMS AND METHODS FOR DATA STREAM USING SYNTHETIC DATA

This application is a continuation of U.S. patent application Ser. No. 16/596,886, filed Oct. 9, 2019, the entire contents of which are hereby incorporated by reference in their entireties.

TECHNICAL FIELD

The disclosed embodiments concern a platform for management of artificial intelligence systems. In particular, the disclosed embodiments concern using the disclosed platform to create models of data. These data models can be used to generate synthetic data for testing or training artificial intelligence systems. The disclosed embodiments also concern improvements to generative adversarial network models and adversarially learned inference models.

BACKGROUND

Training artificial intelligence systems can require substantial amounts of training data. Furthermore, when artificial intelligence systems are used with real-world data dissimilar to the training data, these systems may perform poorly. However, use of real-world data for training of artificial intelligence applications designed to operate on sensitive data, such as customer financial records or patient healthcare data, may be severely limited. Such sensitive data is subject to strict regulations governing the storage, transmission, and distribution of the sensitive data. Compliance with such regulations can be burdensome, and thus can inhibit application development.

Instead of using real-world data for training and testing artificial intelligence applications and systems, substitute, or "synthetic" data can be used. However, existing methods of creating synthetic data can be extremely slow and error-prone. For example, manual attempts to desensitize data can fall victim to human error, while processes to automatically desensitize data using regular expressions or similar methods require substantial expertise and can fail when sensitive data is present in unanticipated formats or locations. Neither approach will create synthetic data having statistical characteristics similar to those of the original data, thus limiting the utility of such synthetic data for training and testing purposes.

Real-world data may be coming into the system in real-time. In such a system, the bottle neck of the system may be its memory. Memory is limited and, therefore, simply cannot store all the incoming data. Accordingly, there is a need for systems and methods of creating synthetic data similar to existing datasets that, in turn, can be used to update the statistical properties of the real-world data and produce results in real-time.

SUMMARY

In one exemplary embodiment a system for synthetic data generation may comprise at least one memory storing instructions and at least one processor configured to execute the instructions to perform operations. The system is configured to perform a set of instructions including: receiving a continuous data stream from an outside source; storing the received continuous data stream in a first storage device; monitoring a size of the stored data in the first storage device; and determining whether the size of the stored data reached a first threshold.

The system is further configured to process the stored data, based on the positive determination, wherein processing comprises: determining a total number of samples in the stored data; determining a minimum value, and a maximum value of samples; creating a plurality of bins, wherein the plurality of bins occupy a data range between the determined minimum and maximum values without overlapping; and determining a number of samples within each of the created bin, based on a bin edges, wherein the bin edges are bounds within the data range.

The system is further configured to populate the plurality of bins with synthetic data, wherein the populating comprises: generating, by a synthetic data generator, a plurality of synthetic data points; assigning each of the generated data point to one of the plurality of the bins based on the edges of the bin; updating the number of samples for the plurality of the bins; determining a total number of samples within the data rage, wherein the total number comprises real and generated data point; determining whether the total number reached a second threshold; and based on the positive determination pausing the synthetic data generator.

DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Embodiments of the present disclosure may be implemented using at least one processor and at least one memory, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively, or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like. In some embodiments, the at least one memory may comprise volatile memory, such as random-access memory (RAM), a non-volatile memory, such as a hard disk drive, a flash memory, or the like, or any combination thereof.

The disclosed embodiments can be used to generate synthetic data in real-time based on an incoming data stream. Data generation is performed iteratively using multiple thresholds based on the incoming data stream, available bandwidth, and available system memory. The incoming data stream may be stored in receiving system memory (e.g. RAM). Based on the available memory, multiple thresholds may be set, for example, maximum available memory threshold and processing threshold.

Figure 1:
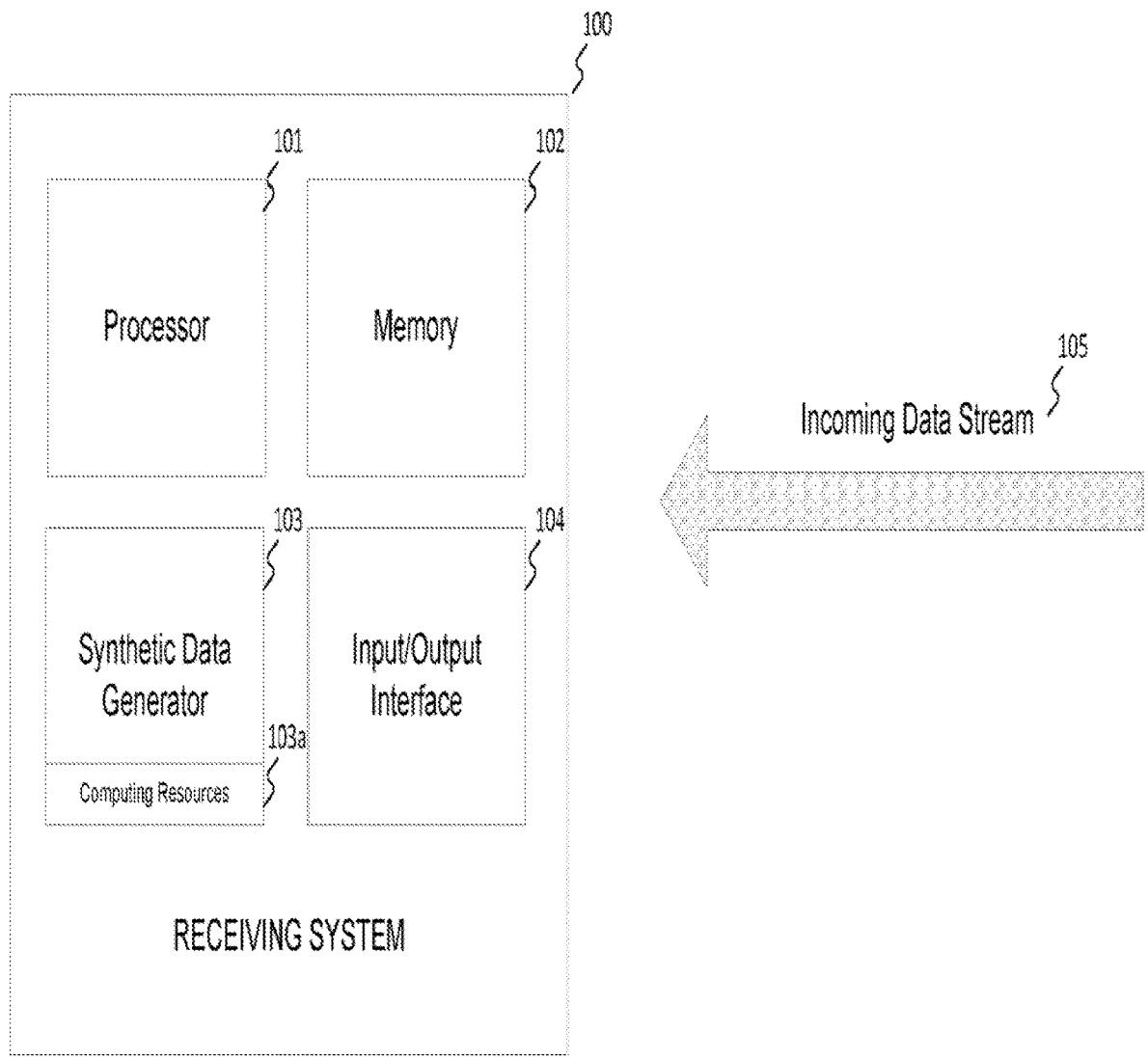
FIG. 1 is a block diagram of an exemplary system for synthetic data generation

FIG. 1 depicts an exemplary system for synthetic data generation, consistent with disclosed embodiments. A receiving system 100 receives an incoming data stream 105. Incoming data stream 105 may be continuous data stream, and may comprise numeric, image, audio, video type of data. Incoming data is received though an input/output interface (I/O) 104 and is stored in part of system memory 102 and further processed by a processor 101. Processor 101 engages a synthetic data generator 103 in accordance with the disclosed embodiments to update statistical properties of the received data. The processed data is may be stored in long-term memory of system 100 or output to other systems through an I/O interface 104.

Synthetic data generator 103 can include one or more computing devices configured to generate data. Synthetic data generator 103 can be configured to provide data to components of system 100, or another system (e.g., an Apache Kafka cluster or other publication service). Synthetic data generator 103 can also be configured to receive data models from model storage, and to generate synthetic data. For example, synthetic data generator 103 can be configured to generate synthetic data by identifying and replacing sensitive information in data received. As an additional example, synthetic data generator 103 can be configured to generate synthetic data using a data model without reliance on input data. For example, the data model can be configured to generate data matching statistical and content characteristics of a training dataset. In some aspects, the data model can be configured to map from a random or pseudorandom vector to elements in the training data space.

Computing resources 103a can include one or more computing devices configurable to train data models. The computing devices can be special-purpose computing devices, such as graphical processing units (GPUs) or application-specific integrated circuits. The computing devices can be configured to host an environment for training data models. For example, computing resources 103a can host virtual machines, pods, or containers. The computing devices can be configured to run applications for generating data models. For example, computing resources 103a can be configured to run SageMaker, Genesys, or similar machine learning training applications. Computing resources 103a can be configured to receive models for training from model optimizer, model storage, or another component of system. Computing resources 103a can be configured provide training results, including trained models and model information, such as the type and/or purpose of the model and any measures of classification error.

A first threshold is the "maximum available threshold," which specifies an absolute maximum amount of data the system is permitted to store in memory. The maximum available threshold may be dynamically modified based on changes to the data stream or changes to the system hardware. For example, the maximum available threshold may be automatically decreased if the data stream becomes smaller or includes fewer features. Alternatively, the maximum available threshold may be increased if the data stream becomes larger or includes more features. The maximum available threshold may also be automatically changed based on hardware changes to the system, e.g, adding or removing memory. Additionally, the maximum available threshold may be changed based on an overall load of the system, e.g. if some other service is scheduled to run at the same time on the same system, the maximum available threshold may be decreased for that period. Alternatively, if a new process is scheduled to start at a specific time, the system may increase the maximum available threshold in an attempt to adjust the current process to finish by the specified time by allocating additional resources. The maximum available threshold may also be preset, adjusted manually, or adjusted dynamically throughout the process or at specified times.

A second threshold is the "processing threshold," which specifies a "window size" at which a processing engine is engaged. A window size specifies a size of the dataset to be processed and affects the accuracy and the overall processor load. The processing threshold is used to maintain a balance between accuracy, processing speed, and cost, and can be preset or modified based on system performance. The processing threshold may also be modified manually or automatically, or at set points of the method consistent with the disclosure and based on the changes to incoming data stream 105. For example, if incoming data stream 105 is periodic, the processing threshold might be increased to maximize usage of idle resources during low incoming data periods; if incoming data stream 105 unexpectedly increases, the processing threshold might be increased to increase processing speed in order to avoid exceeding the maximum available threshold; etc. The processing threshold may be also modified based on the system specifications, e.g. if a new processing core is added, if other processes with higher priority are run on the same system, etc.

Figure 2:
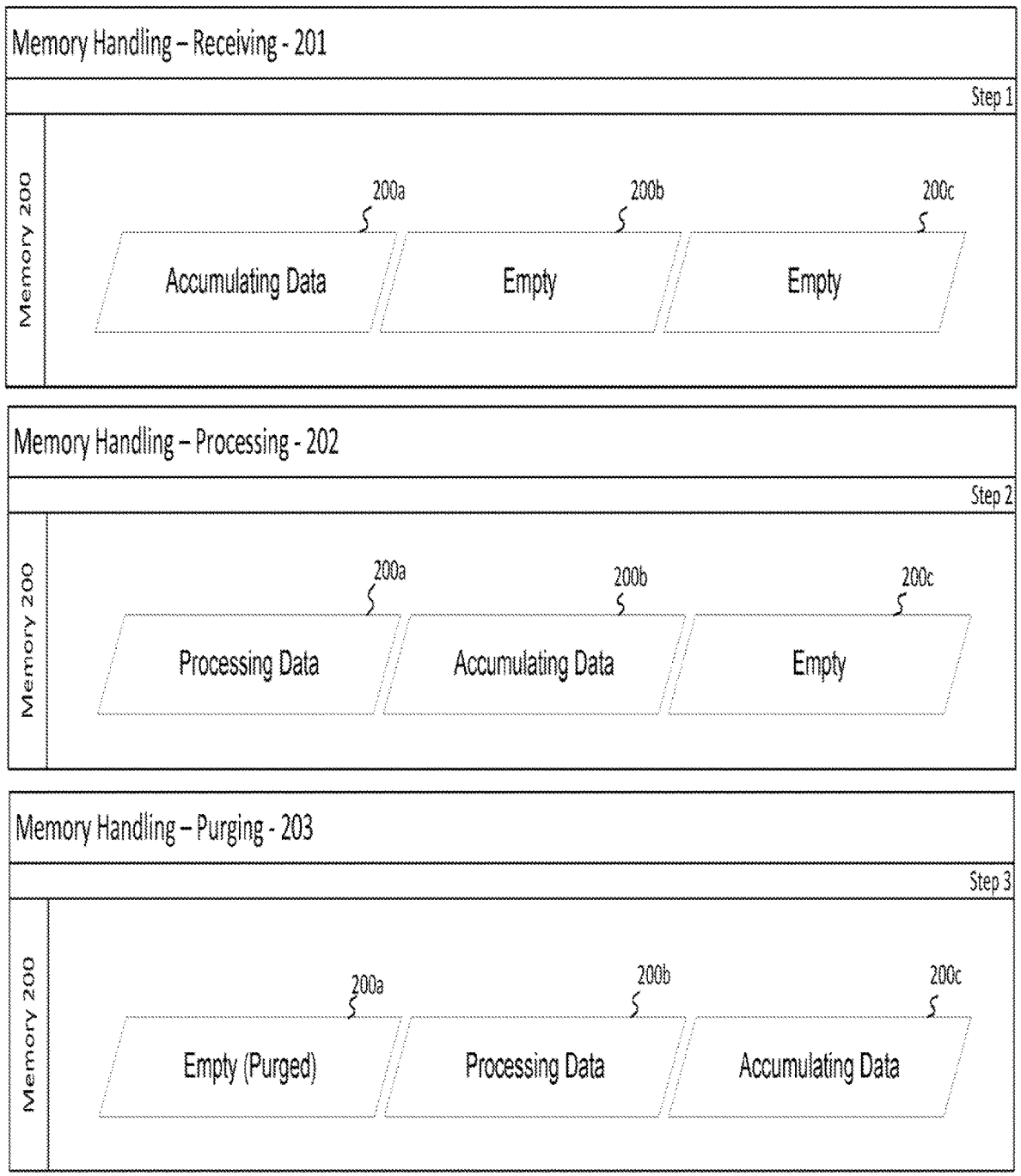
FIG. 2 is a schematic diagram of a memory-handling scheme of the system.

FIG. 2 depicts a memory-handling scheme of receiving system 100. Memory 200 is a subset of system memory 102. Memory is handled based on a plurality of dynamic thresholds as disclosed in the embodiments. In the depicted memory-handling scheme, a first step 201 is receiving data from continuous data stream 105. A first subset of data is accumulated in a first portion, or "window", 200a of memory 200, allocated based on the processing threshold. Once the processing threshold is reached, processing takes place at step 202. "Processing" will be explained more fully below, with respect to FIG. 5.

Data in first memory portion 200a begins processing and simultaneously a second subset of data from data stream 105 begins to accumulate in a window of a same size or adjusted based on the processing threshold second memory portion 200b. After data in first memory portion 200a is processed and stored in a long-term storage memory or sent to another system, first memory portion 200a is purged, as depicted in step 203. Memory portion 200a becomes available for accumulation of data, and the accumulated second subset of data in memory portion 200b will begin to be processed, while a third portion of memory 200c is accumulating new data. The depicted memory handling allows for efficient memory management and real time processing.

Figure 3:
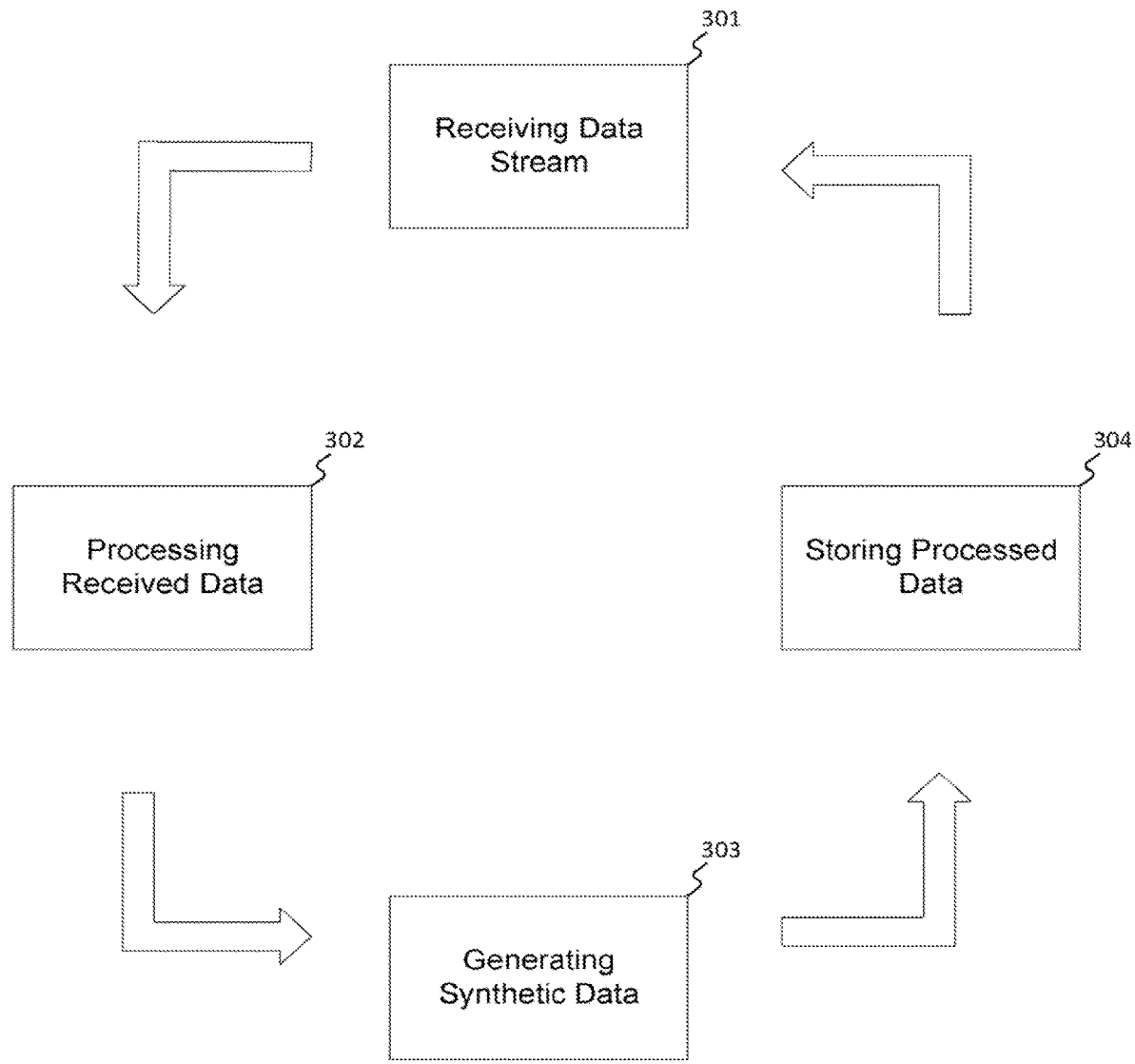
FIG. 3 is a flow chart of a process behind the memory-handling scheme of FIG. 2.

FIG. 3 depicts a flow chart demonstrating a method 300 behind the memory-handling scheme of FIG. 2. Method 300 may be performed by receiving system 100. Receiving the data stream is a continuous operation and is performed until the data stream ceases to be received, or the system is otherwise shutdown. At 301, data is received. At 302, the received data is handled as described in FIG. 2. At 303, synthetic data is generated to enhance the received data stream. The actual process of generating synthetic data is described more completely in recently allowed U.S. patent application Ser. No. 16/151,385, the contents of which are hereby incorporated by reference.

The enhanced dataset may comprise a mix of synthetic data with real data whereby increasing the accuracy of the statistical approximations which may be performed on the enhanced dataset. At 304, processed data, comprising data from data stream 105 as well as additional generated synthetic data, is stored in another memory section or passed to a different system. The original memory section 200a (FIG. 2) is purged for future accumulation of data.

Processing is performed at 302 by the receiving system 100, iteratively based on the window size specified by the processing threshold. The data accumulated in the window (later referred to as "the data model") is analyzed to determine minimum and maximum data ranges and number of data items, or "samples." The number of samples defines the complexity of the incoming data stream. At its simplest, the data stream may be, for example, a single number, e.g. salary, age, tax, etc. Another more complex example is a stream of images, each image including multiple features which will have to be analyzed and ranked on min/max data range—the more features each image includes the higher the number of samples will be. An even more complex example is a video stream, which will include 24 frames per second of images (or higher for high frame rate videos) plus an additional stream of audio data, which will have a number of features to be analyzed as well. Analysis may be performed by using neural networks (e.g. recurrent neural network, generative adversarial network, etc.), or other machine learning techniques.

Figure 4:
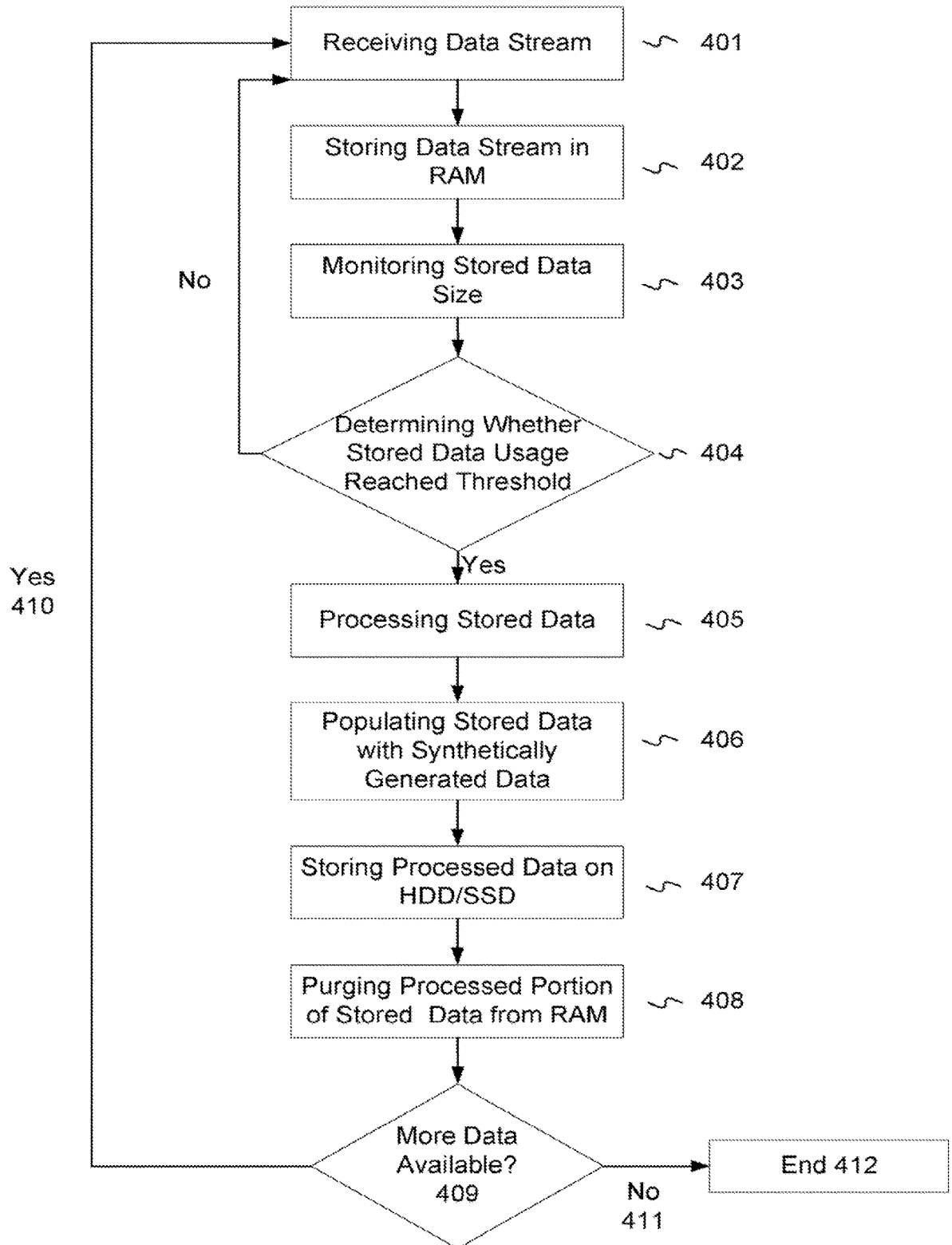
FIG. 4 is a flow chart of a process for data stream synthetic data generation.

FIG. 4 depicts a flow chart demonstrating a more detailed exemplary illustration 400 of the method depicted in the FIG. 3. At 401, a data stream is received. At 402, the received data is stored in some type of memory, e.g. RAM. At 403, the amount of stored data is monitored to determine if it exceeds processing threshold. If the threshold is met, the stored data is processed at 405. The synthetic data is generated at 406 to enhance the dataset. At 407, the enhanced data set is stored on the long-term data storage memory e.g. HDD, SSD, etc. At 408, memory portion 200a (FIG. 2) occupied by the original data is purged to make room for new data. At 409, it is determined if more data is available in the incoming data stream. If so, the process returns to step 401. If not, the process ends at 412.

Figure 5:
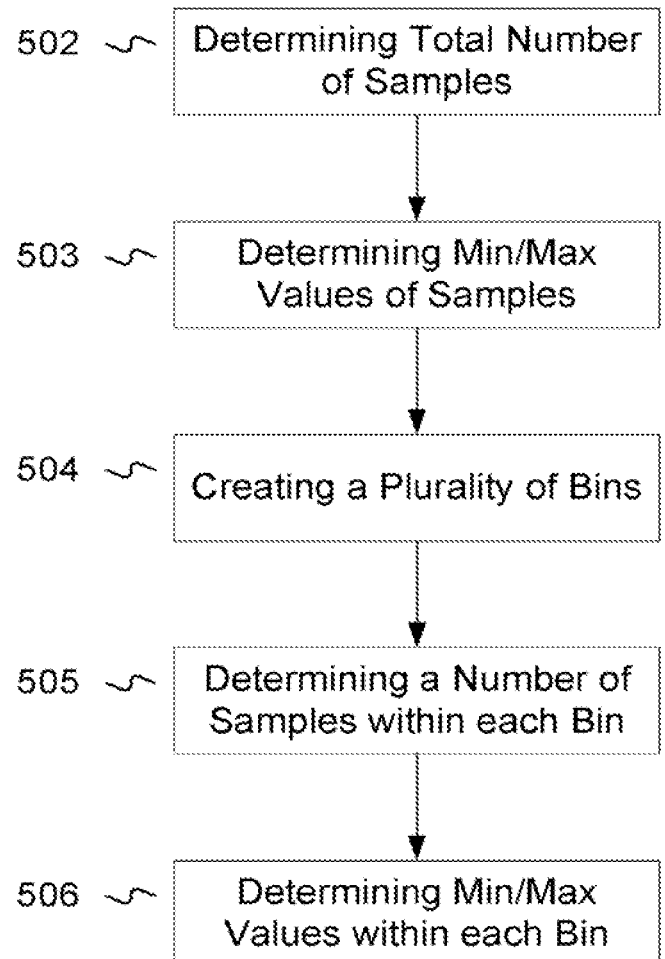
FIG. 5 is a flow chart of a process for stored data processing.

FIG. 5 depicts a flow chart of a method 500 for processing the stored data by receiving system 100. In step 502, system 100 determines a total number of samples within a dataset 200a (FIG. 2). The dataset is analyzed at step 503 to determine minimum and maximum values of the samples. At steps 504-506, the data set is split by receiving system 100 into a plurality of bins. Specifically, at 504, a plurality of bins are created, with each bin having a data range assigned to it. At 505, samples of the data set are allocated to the created bins and a number of samples within each of the bins is determined. At 506, bins are further analyzed to determine minimum and maximum values for each bin.

After the initial analysis is performed, receiving system 100 may generate additional synthetic data to increase accuracy of the data model (FIG. 3, step 303; FIG. 4, step 406; and FIG. 6). The amount of additional data to be generated may depend on an accuracy threshold. The accuracy threshold may be preset, or adjusted automatically or manually, based on the determined min/max and number of samples. Based on the accuracy threshold, data generator 103, FIG. 1, may be engaged to populate the data model with synthetic data.

Figure 6:
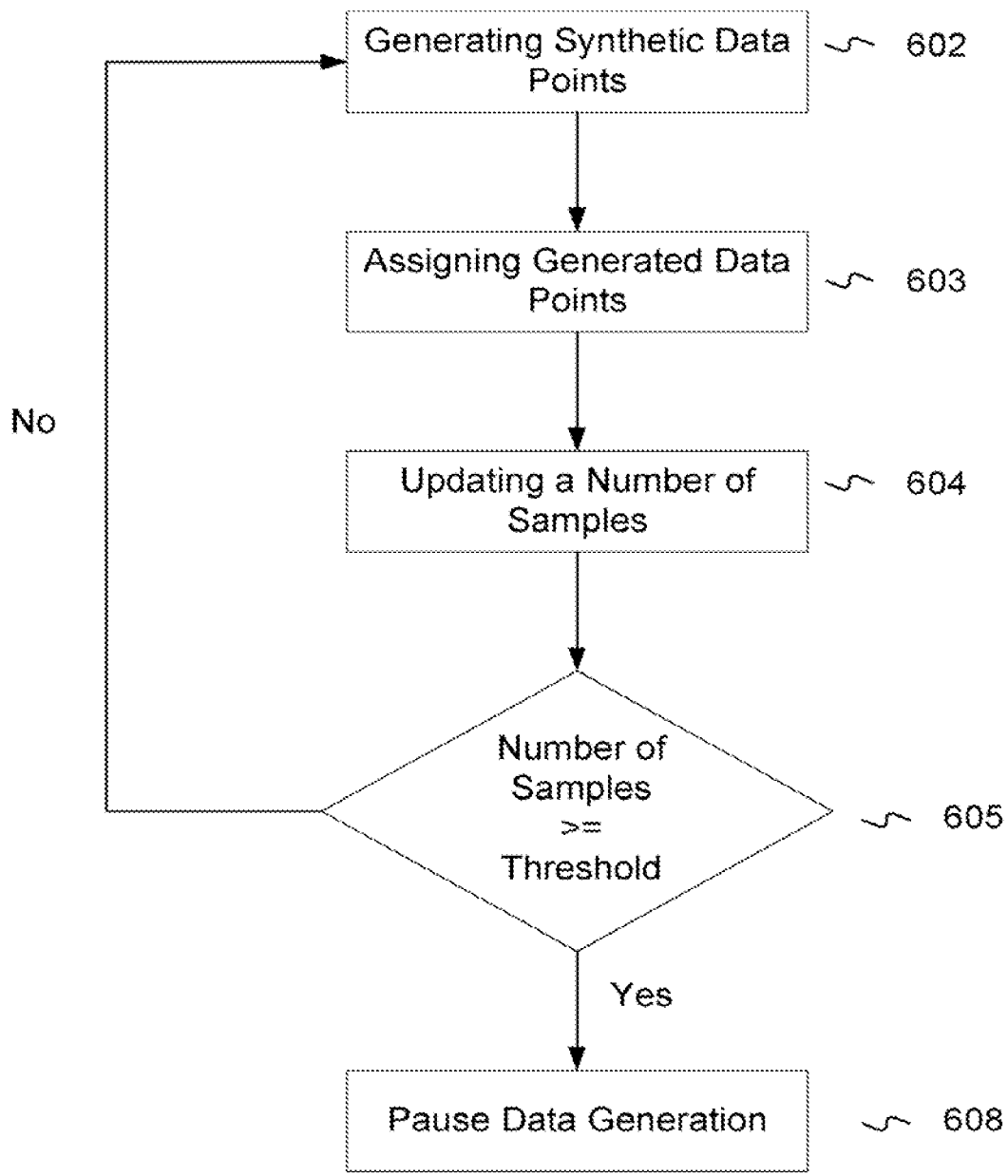
FIG. 6 is a flow chart of a process for populating stored data with generated synthetic data.

FIG. 6 is a flow chart of a method 600 for populating stored data with synthetic data 601 by receiving system 100. At 602, synthetic data points are generated, wherein values of the synthetic data points are based on the min/max values determined at steps 503 and 506 of FIG. 5. At 603 generated synthetic data points are assigned to bins, created at step 504, based on the value of the synthetic data points. The number of samples in each bin is updated at 604 and compared to the accuracy threshold at 605. If the threshold is met (605 YES), the process is paused 608. Otherwise (605 NO), the process repeats steps 602-605 until the threshold is met.

Data generator 103 may be engaged to generate sets of synthetic data (FIG. 3, step 303; FIG. 4, step 406; and FIG. 6) based on a generator threshold, as shown in step 605. The generator threshold specifies how many data points are generated at each iteration of the method of FIG. 6. The generator threshold may be preset, or set manually or automatically based on the determined min/max values of the samples and the number of samples.

The data model (data accumulated within one window 200a, FIG. 2) may be trained iteratively, as it is populated by the data generator. At each iteration, the data model is analyzed and the min/max of the data ranges and total number of samples are updated. Alternatively, data model may be assigned to a plurality of bin allocations based on the determined min/max data ranges for each of the features. Each bin comprises edge widths, and one or more sample values that fall within the edge width. Edge widths may define data ranges for each of the bins and may be changed to minimize the overall error of approximating the original distribution. The bin edge width is taken into the account by the data generator when, for example, new data is generated. Each bin may have different edge widths. For example, if a histogram is produced from the accumulated data, the system may be configured to generate more data around the peaks of the histogram instead of edges, providing increased accuracy near the maximum. Variation is a range of values between the edge widths of the bin. The sum of variations of all bins will comprise the total variation of the data model. Each bin edge width may be modified independently from total variation of the data model using similar techniques e.g. manually or automatically, dynamically or at the specified points.

The processed data is output in a computer-readable format to the destination memory, which may be a subset of memory 102 or memory of another system, and is purged from the receiving system memory. Purging the receiving system memory allows the new data to be stored and processed iteratively in real time. The processed data might be used to create a histogram for displaying the processed data and perform various calculations, e.g. data profiling which requires accurate statistical characteristics such as distributions (pdf, cdf), percentiles, etc.

After the processing and populating steps are completed the system is further configured to perform a set of instructions including: creating a processed dataset based on the plurality of bins; storing processed dataset in a second storage device; and releasing the first storage device capacity occupied by the stored data. The continuous data stream might include sensitive data, wherein sensitive data is defined as information that might cause harm if disclosure, e.g. social security number, bank account balance, legal status, etc.

The first storage device may be receiving system memory 102 which may be a random access memory, cache or any other fast type memory suitable for real-time data processing. The second storage device may be a destination system memory which may be an electro-mechanical data storage device, a nonvolatile flash memory, or any other type of memory suitable for long term storage of data. Synthetic data generator 103 might be using a recurrent neural network, a generative adversarial network, or any other form of machine learning suitable for data generation. Incoming data stream 105 might include various types of data such as numeric data, image data, video data, audio data, etc.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead are defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

It is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

The foregoing description is presented for purposes of illustration. It is not exhaustive and is not limited to the precise forms or embodiments disclosed. Modifications and adaptations of the embodiments will be apparent from consideration of the specification and practice of the disclosed embodiments.

Computer programs based on the written description and methods of this specification are within the skill of a software developer. The various programs or program modules can be created using a variety of programming techniques. One or more of such software sections or modules can be integrated into a computer system, non-transitory computer readable media, or existing software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application. These examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for synthetic data generation, comprising:
   at least one processor; and
   at least one non-transitory memory storing instructions that, when executed by the at least one processor, cause the system to perform operations comprising:
   determining a size of stored streaming data, stored in a first storage device, has reached a first threshold;
   in response to the size determination, processing the stored streaming data, the processing comprising:
   determining a total number of samples in the stored streaming data;
   creating a plurality of bins, the bins having data ranges between a minimum and a maximum sample value;
   assigning the samples to the bins, based on values of the samples and data ranges of the bins; and
   determining a number of samples within the bins;
   populating the bins with synthetic data, the populating comprising:
   generating, by a synthetic data generator, a plurality of synthetic data points; and
   assigning the synthetic data points to the bins based on values of the synthetic data points and data ranges of the bins;
   determining a total number of the synthetic data points in the bins has reached a second threshold;
   in response to the determination of whether the total number has reached a second threshold, pausing the synthetic data generator;
   creating a processed dataset based on the bins; and
   storing the processed dataset on a second storage device.

2. The system of claim 1, wherein the first threshold is automatically adjusted based on changes to the system.

3. The system of claim 1, wherein the processed dataset is a histogram.

4. The system of claim 1, wherein the first storage device is a random access memory.

5. The system of claim 1, wherein the second storage device is one of an electro-mechanical data storage device or a nonvolatile flash memory.

6. The system of claim 1, wherein generating a plurality of synthetic data points comprises generating a plurality of synthetic data points using a recurrent neural network.

7. The system of claim 1, wherein generating a plurality of synthetic data points comprises generating a plurality of synthetic data points using a generative adversarial network.

8. The system of claim 1, wherein the operations further comprise adjusting the first threshold based on characteristics of the stored streaming data.

9. The system of claim 1, wherein the operations further comprise adjusting the second threshold based on characteristics of the stored streaming data.

10. A system for synthetic data generation, comprising:
at least one processor; and
at least one non-transitory memory storing instructions that, when executed by the at least one processor, cause the system to perform operations comprising:
determining a size of stored streaming data has reached a first threshold, wherein the first threshold is dynamically adjusted based on changes to the stored streaming data or hardware of the system;
in response to the size determination, processing the stored streaming data, wherein the processing comprises determining a total number of samples in the stored streaming data and a range of values for the stored streaming data;
creating a synthetic dataset based on the processed stored streaming data, the creating comprising: generating, by a synthetic data generator, a plurality of synthetic data points, the plurality of synthetic data points being determined based on the total number of samples and the range of values for the stored streaming data; and
storing the synthetic dataset.

11. The system of claim 10, wherein the first threshold specifies a maximum storage capacity.

12. The system of claim 10, wherein the stored streaming data comprises numerical data.

13. The system of claim 10, wherein the stored streaming data comprises image data.

14. The system of claim 10, wherein the stored streaming data comprises video data.

15. The system of claim 10, wherein the operations further comprise performing data profiling calculations on the synthetic dataset.

16. The system of claim 10, wherein the stored streaming data contains sensitive data.

17. A method for synthetic data generation comprising:
determining a size of stored streaming data has reached a first threshold;
in response to the size determination, processing the stored streaming data, the processing comprising:
determining a size of the stored streaming data has reached a first threshold, wherein the first threshold is dynamically adjusted based on changes to the stored streaming data or hardware of the system; and
in response to the size determination, processing the stored streaming data, wherein the processing comprises determining a total number of samples in the stored data and a range of values for the stored data;
creating a synthetic dataset based on the processed data, the creating comprising:
generating, by a synthetic data generator, a plurality of synthetic data points, the plurality of synthetic data points being determined based on the total number of samples and the range of values for the stored data; and
storing the synthetic dataset.

18. The method of claim 17, wherein the method further comprises performing data profiling calculations on the synthetic dataset.

19. The method of claim 17, wherein the method further comprises adjusting the first threshold based on characteristics of the stored streaming data.

20. The method of claim 17, wherein the method further comprises adjusting a second threshold based on characteristics of the stored streaming data.

* * * * *